(12) United States Patent
Sobotka (10) Patent No.: US 9,790,340 B2
(45) Date of Patent: Oct. 17, 2017

(54) VAPOUR BARRIER AND INSULATION FOR WALL BOX

(71) Applicant: JB & FT CONSTRUCTION LTD., Mississauga (CA)

(72) Inventor: Jozef Sobotka, Mississauga (CA)

(73) Assignee: JB & FT CONSTRUCTION LTD., Mississauga (CA)

( * ) Notice: Subject to any disclaimer, the term of this patent is extended or adjusted under 35 U.S.C. 154(b) by 121 days.

(21) Appl. No.: 14/591,958

(22) Filed: Jan. 8, 2015

(65) Prior Publication Data

US 2016/0102183 A1 Apr. 14, 2016

Related U.S. Application Data

(60) Provisional application No. 61/928,060, filed on Jan. 16, 2014.

(51) Int. Cl.
| | |
|---|---|
| *F24F 7/00* | (2006.01) |
| *F24F 7/013* | (2006.01) |
| *F24F 13/02* | (2006.01) |
| *F24F 13/08* | (2006.01) |
| *C08J 9/00* | (2006.01) |

(52) U.S. Cl.
CPC .............. *C08J 9/00* (2013.01); *F24F 7/00* (2013.01); *C08J 2375/04* (2013.01); *F24F 13/02* (2013.01); *F24F 13/08* (2013.01); *F24F 13/082* (2013.01); *F24F 2007/003* (2013.01); *Y10T 29/4984* (2015.01); *Y10T 29/49826* (2015.01); *Y10T 29/49915* (2015.01)

(58) Field of Classification Search
CPC ... C08J 9/00; C08J 2375/04; Y10T 29/49915; Y10T 29/49826; Y10T 29/4984; F24F 7/013; F24F 13/02; F24F 13/08; F24F 13/082; F24F 7/00; F24F 2007/003

USPC .......... 29/509, 434, 428; 454/254, 275, 276, 454/283, 367, 368

See application file for complete search history.

(56) References Cited

U.S. PATENT DOCUMENTS

| | | | | |
|---|---|---|---|---|
| 4,714,575 A * | 12/1987 | Preston | ............... | B29C 44/0469 264/257 |
| 4,783,296 A * | 11/1988 | Fischer | .................. | B29C 33/60 264/338 |
| 5,112,543 A * | 5/1992 | Thary | .................... | B29C 33/62 264/130 |
| 5,160,772 A * | 11/1992 | Futami | .................... | B29C 70/26 428/318.8 |
| 5,292,281 A * | 3/1994 | Butler | .................. | E04D 13/152 454/260 |
| 6,072,115 A * | 6/2000 | Inoue | .................... | H01L 31/048 136/244 |
| 6,183,360 B1 * | 2/2001 | Luter, II | .................... | F24F 7/02 454/366 |

(Continued)

*Primary Examiner* — Christopher Besler
*Assistant Examiner* — Bayan Salone
(74) *Attorney, Agent, or Firm* — Perry + Currier Inc.

(57) ABSTRACT

A pre-formed covering for moisture-proofing and insulating a wall box (also called a vent box and exhaust box) and method of moisture-proofing and insulating a wall box using the pre-formed covering. The pre-formed covering is made of an air impermeable and insulating material, and is configured, shaped and dimensioned to fit over at least a portion of the wall box and be sealable to the wall box to minimize leakage of air and/or moisture from the wall box.

24 Claims, 9 Drawing Sheets

(56) References Cited

U.S. PATENT DOCUMENTS

| | | | | |
|---|---|---|---|---|
| 2006/0061001 A1* | 3/2006 | Wamshuis | ............. | B29C 44/38 |
| | | | | 264/45.5 |
| 2011/0209353 A1* | 9/2011 | Goemans | ................ | D06F 58/02 |
| | | | | 34/82 |
| 2011/0312263 A1* | 12/2011 | Grandmaison | ....... | F24F 13/082 |
| | | | | 454/283 |

* cited by examiner

VAPOUR BARRIER AND INSULATION FOR WALL BOX

This application claims the benefit under 35 U.S.C. 119(e) of U.S. provisional application 61/928,060 filed Jan. 16, 2014, of which the contents are wholly incorporated herein by reference.

FIELD OF THE INVENTION

The present invention relates to vapour barriers and insulation for wall boxes (also called vent boxes and exhaust boxes) that are used in the construction industry. The invention also relates to methods of applying a vapour barrier and insulating material to the wall boxes.

BACKGROUND OF THE INVENTION

Wall boxes are hollow structures defining an air flow channel or channels that are used to carry air or exhaust from inside a building (residential or commercial) to the outside. They are usually placed near a window to carry air from rooms that need venting, such as a kitchen, washroom, laundry room, or the like, to the outside.

In the construction of a building, a wall box is typically mounted to an exterior wall, or to a component of the wall such as a window frame assembly. Once mounted, the wall box is covered with a moisture-proof and insulating material and tape is used to seal the edges of the material. The material, thus sealed, prevents moisture from escaping from the wall box, such as moisture resulting from condensation on the exterior of the wall box during normal use conditions, or from air flowing through the wall boxes. Such moisture, if it escapes, can lead to mould and other moisture-related problems. The insulating property of the material allows the building to be heated and cooled more efficiently.

A conventional method for moisture-proofing and insulating a wall box is to use a spray gun to apply polyurethane foam to the exterior of the wall box, save for a flanged opening to which another vapour barrier is attached. Upon spraying, the foam expands and solidifies into an uneven and irregular mass. A problem with this conventional method is that it is very labour intensive as multiple applications of foam may be required to ensure that there are no holes in the sprayed foam that would undermine the insulating and moisture-proofing properties of the material. The final product also has an uneven and irregular surface which makes it challenging to apply a further vapour barrier in the form of plastic sheeting in such a way as to provide a proper seal.

Further challenges are experienced by subsequent tradesmen, i.e. drywall tradesmen, who must, in some situations, cut the foam in order to make space to install the drywall. When the foam is cut, holes can reappear which would undermine the integrity of the foam structure.

SUMMARY OF THE INVENTION

The present invention provides a new and improved vapour barrier and insulating product and method for moisture-proofing and insulating wall boxes. A molded foam sleeve covers the exposed wall box. The sleeve is sealed with caulking material to provide an airtight seal between the foam sleeve and wall box to ensure no moisture and air can travel from the wall box into the building.

The foam sleeve consists of evenly distributed foam which is not required to be trimmed or cut by subsequent tradesmen thereby avoiding the possible introduction of holes in the product. The application of the foam sleeve to the wall box is faster than the traditional method that requires the foam to dry and cure and be (possibly) applied multiple times.

The present invention provides better insulating properties and a taping platform that is easier to use, to achieve greater overall reliability.

The invention may be better understood with reference to the following description and drawings.

DETAILED DESCRIPTION OF THE EMBODIMENTS

Figure 1:
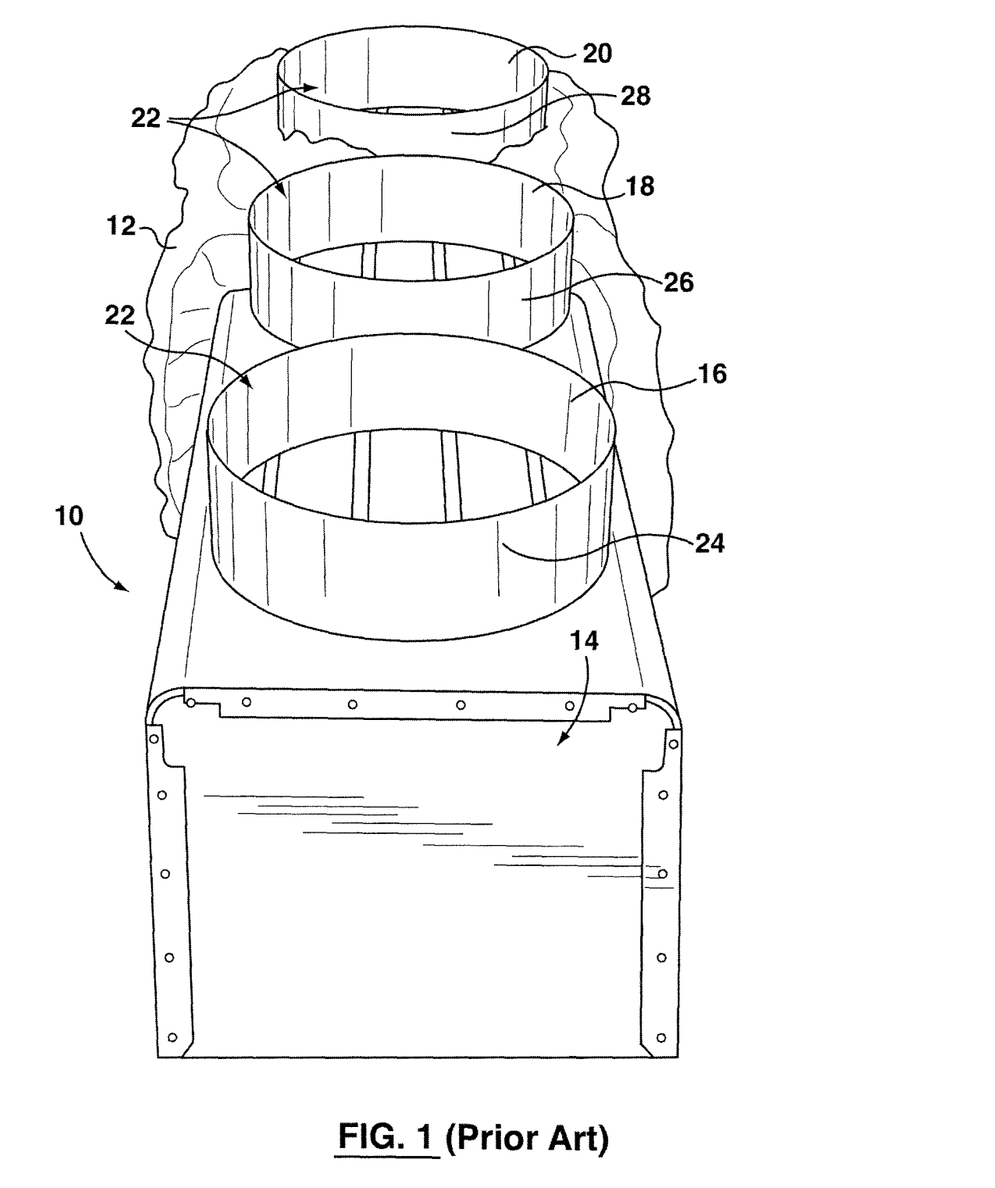
FIG. 1 is a perspective view of a three inlet wall box with a conventional spray foam vapour barrier and insulating material applied to a portion thereof.

Referring to FIG. 1, a three inlet wall box designated generally by reference numeral 10 is shown partially covered by polyurethane spray foam insulation 12. The wall box 10 has a body made of sheet aluminum designated generally by reference numeral 14. The body 14 defines, in this embodiment, three inlets 16, 18, 20, and an outlet (not shown in this drawing) opposite the inlets 16, 18, 20, and an air flow channel 22 between and in fluid communication with the inlets 16, 18, 20 and the outlet. Features of the wall box 10 and other embodiments of wall boxes will be described further below.

Figure 2A:
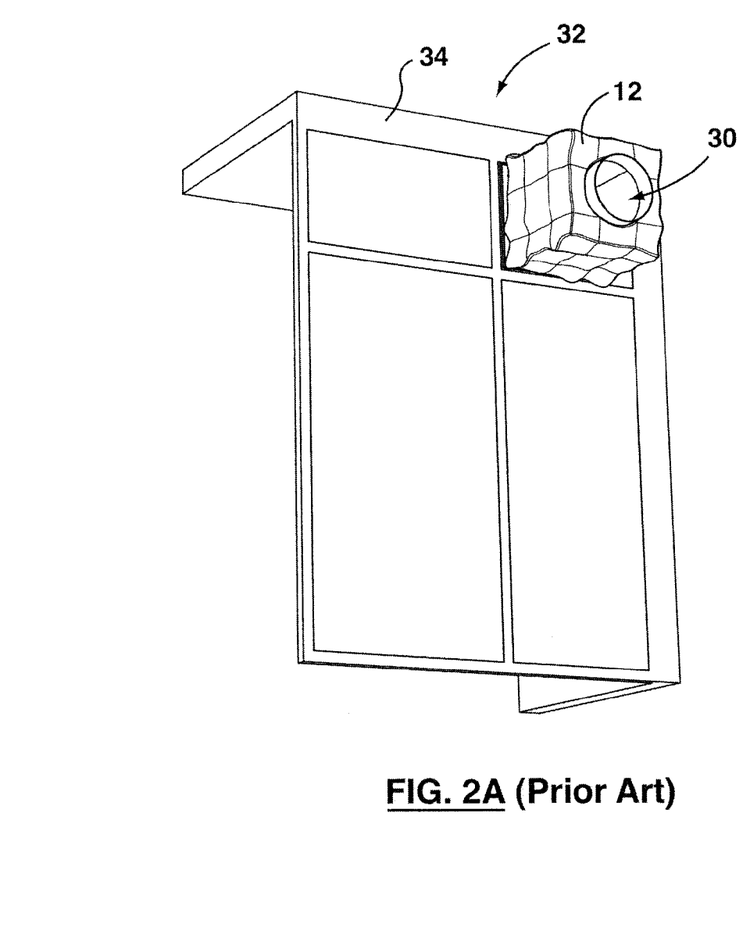
FIG. 2A is an isometric, interior view of a window frame and single inlet wall box assembly to which a conventional spray foam vapour barrier and insulating material has been applied.

As shown in FIG. 1, the spray foam insulation 12 has an uneven surface. To avoid holes, the insulation is applied using a spray gun multiple times. Tape (not shown) is applied to seal gaps at the edges of the insulation, such as where the insulation meets the circular flanges 24, 26, 28, that define the inlets 16, 18, 20. The uneven surface and dimensions of the foam give rise to the problems mentioned above. FIG. 2A shows the conventional spray foam insulation 12 applied to a single inlet wall box designated generally by reference numeral 30. The wall box 30 is shown mounted within an assembly 32 which includes a window frame 34. The entire assembly is typically mounted to an exterior wall of a building prior to applying the foam insulation.

Figure 2B:
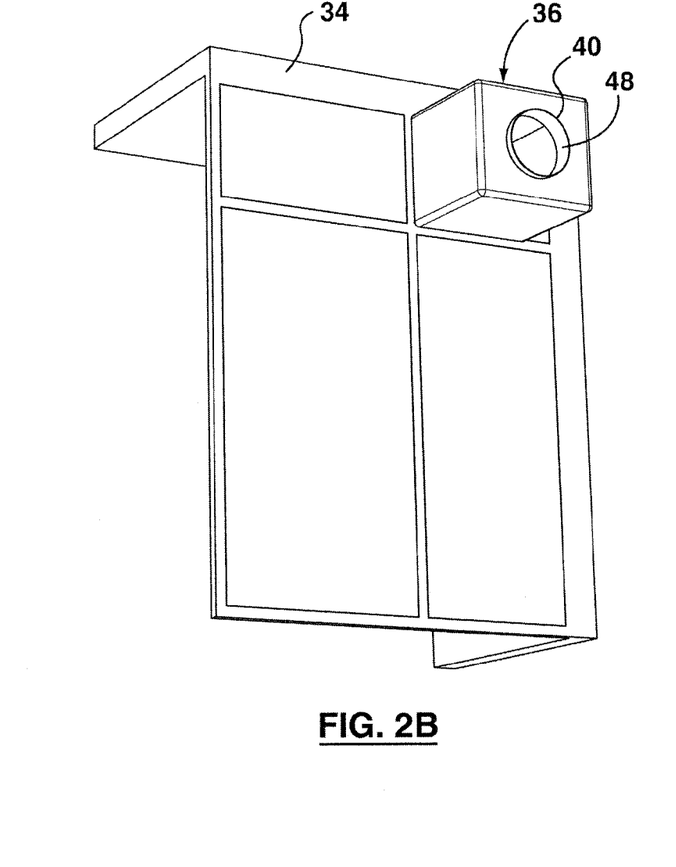
FIG. 2B is an isometric, interior view of a window frame and single inlet wall box assembly to which a pre-formed covering according to a first embodiment of the invention has been installed.
Figure 6:
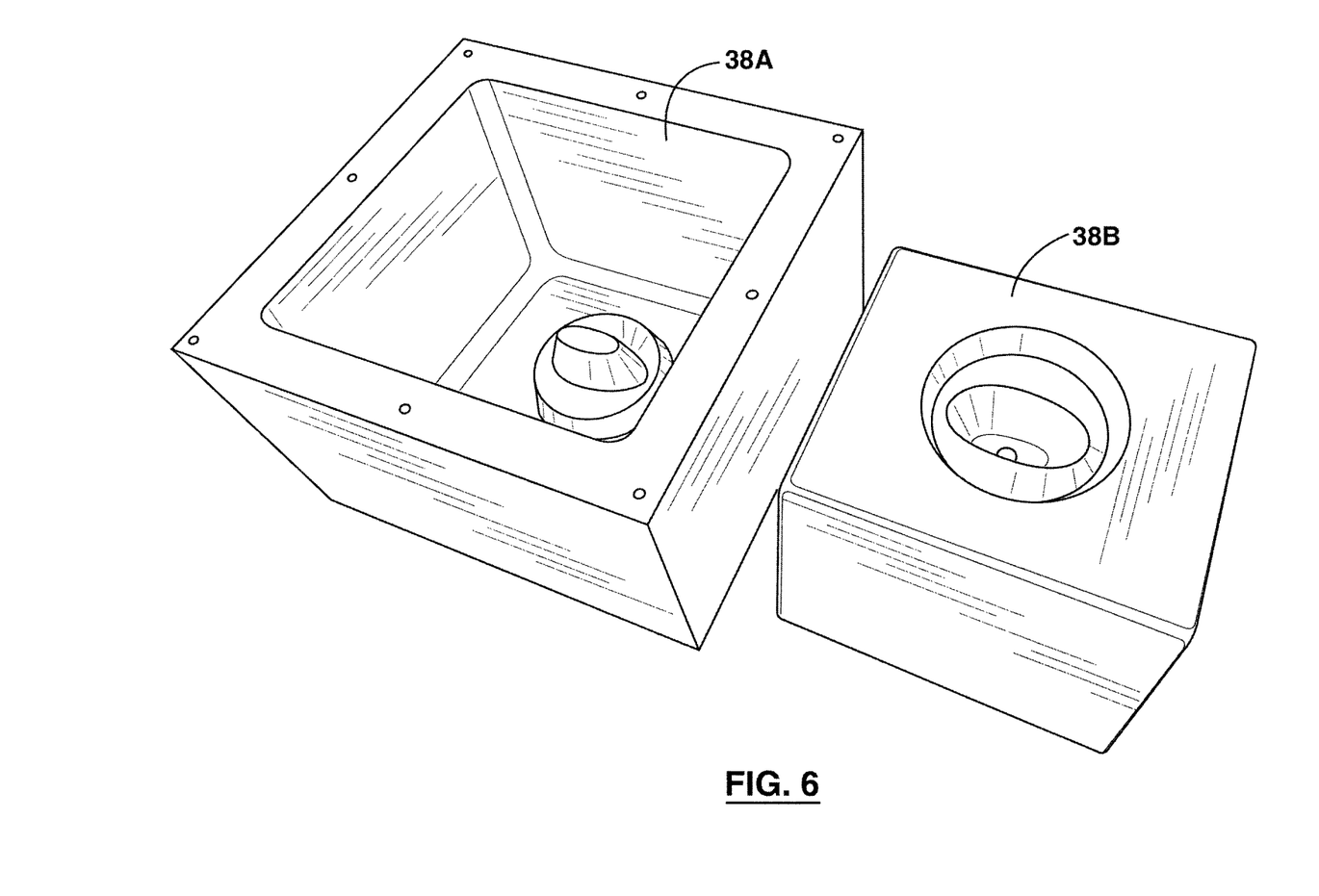
FIG. 6 is a perspective view of an embodiment of a two-piece mold that can be used to make a pre-formed covering according to the invention.

A unitary, single opening pre-formed covering 36 according to a first embodiment of the invention is shown in FIG. 2B. The pre-formed covering is moulded from polyurethane moulding foam, which in this embodiment is the foam sold in association with the trademark POLARFOAM™ PF-6352-0, and consisting of a two-part, polyol isocyanate blend. To make the pre-formed covering 36, a conventional release agent (such as Teflon, oil, polyethylene, silicon, etc.) is applied to the interior surface of a two piece mould 38A, 38B shown in FIG. 6. The material of the pre-formed covering 36 is prepared according to manufacturer specifications and poured (or sprayed using a gun into the two piece mould 38A, 38B and allowed to solidify. Once solidified, the pre-formed covering 36 is removed from the mould 38A, 38B and is impermeable to air and moisture, and is insulating. The covering is also rigid and has a smooth and flat outer surface. The mould 38A, 38B is designed to make a pre-formed covering 36 that is configured, shaped and dimensioned to fit over the wall box 30 as perhaps best shown in FIGS. 3B, 3C, 3D and 3E. Referring to these figures, the pre-formed covering 36 can be placed over that portion of the body of the wall box 30 comprising a pair of integrally connected, spaced parallel side walls 42a, 42b, 42c, 42d, that together define a portion of an air flow channel 44 therebetween, as well as a front wall 46 integrally formed with and extending transversely to the side walls 42a, 42b, 42c, 42d at a first end of the side walls (see FIG. 3E). The wall box 30 also has a tubular wall in the form of a circular flange 40 that is coupled (attached) and extending transversely to the front wall 46, which defines an air or exhaust inlet 48.

Figure 3A:
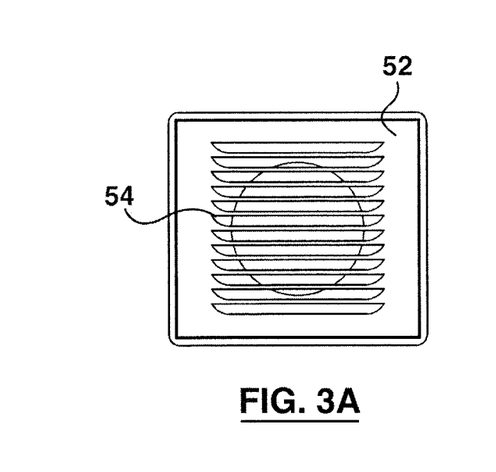
FIG. 3A is an exterior side view showing a "rear" wall of the wall box of FIG. 2B.
Figure 3B:
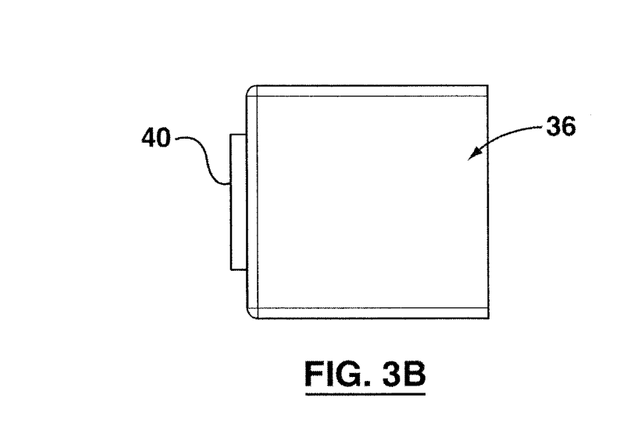
FIG. 3B is a side view of the wall box of FIG. 3A shown with the pre-formed covering of FIG. 2B installed thereon.
Figure 3C:
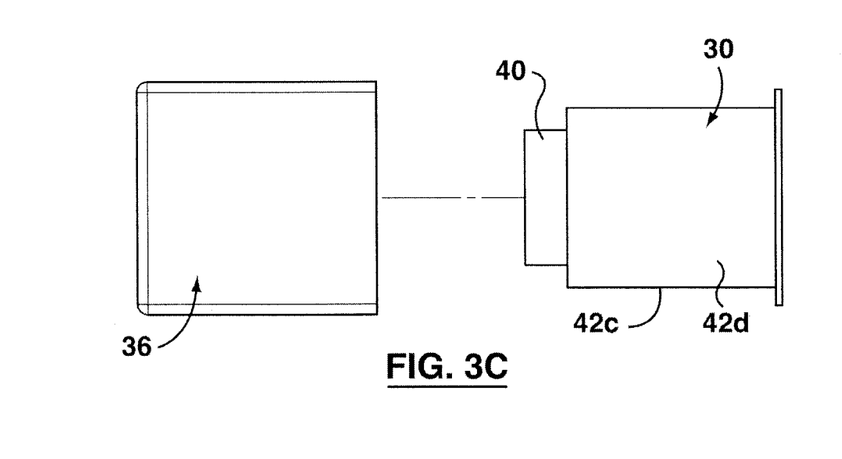
FIG. 3C is an exploded side view of the wall box and pre-formed covering of FIG. 2B.
Figure 3D:
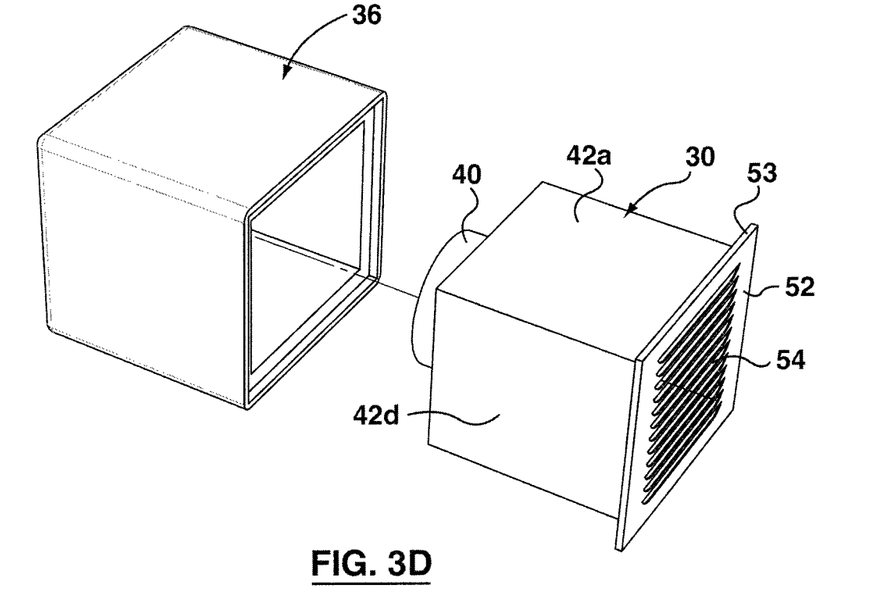
FIG. 3D is an exploded isometric view of the wall box and pre-formed covering of FIG. 2B as seen from a first vantage point.
Figure 3E:
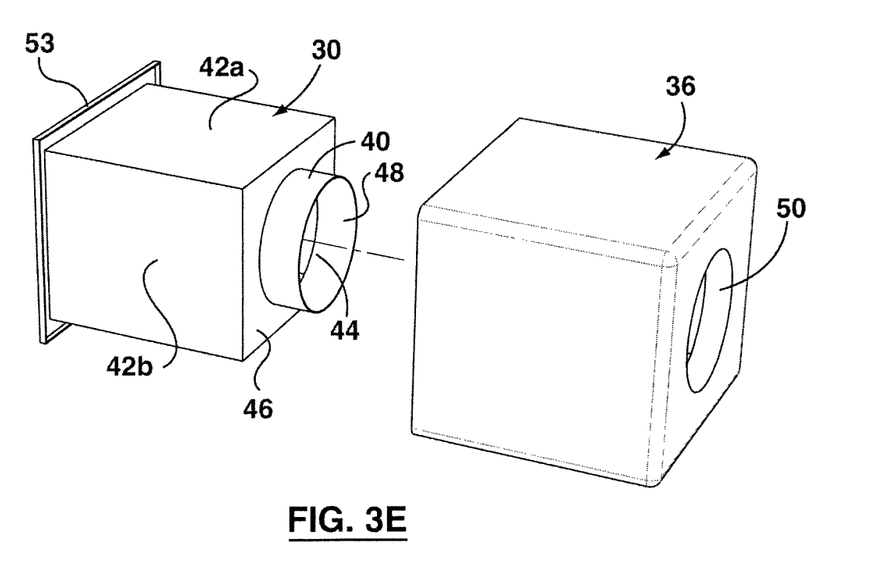
FIG. 3E is an exploded isometric view of the wall box and pre-formed covering of FIG. 2B as seen from a second vantage point generally opposite the first vantage point.
Figure 4A:
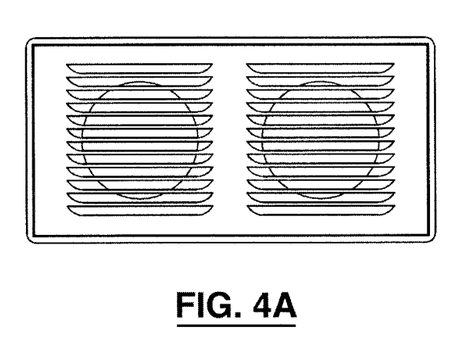
FIG. 4A is an exterior side view showing a "rear" wall of a two inlet wall box.
Figure 4B:
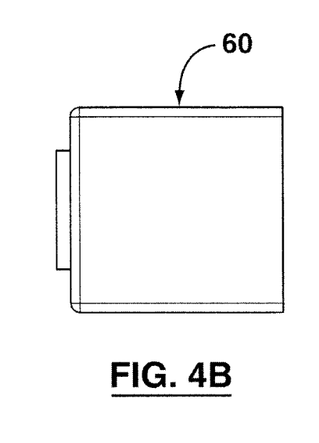
FIG. 4B is a side view of the wall box of FIG. 4A shown with a pre-formed covering according to a second embodiment of the invention installed thereon.
Figure 4C:
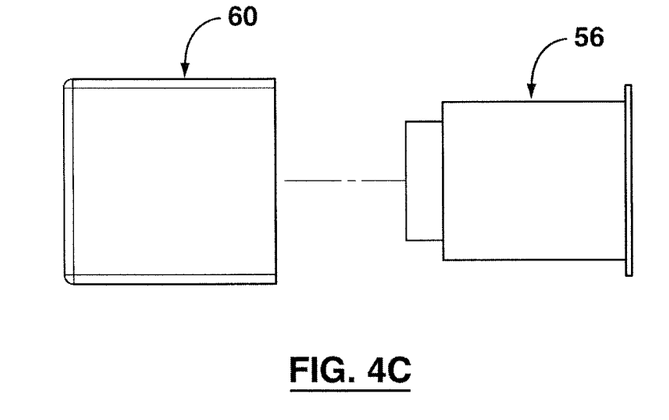
FIG. 4C is an exploded side view of the wall box and pre-formed covering of FIG. 4A.
Figure 4D:
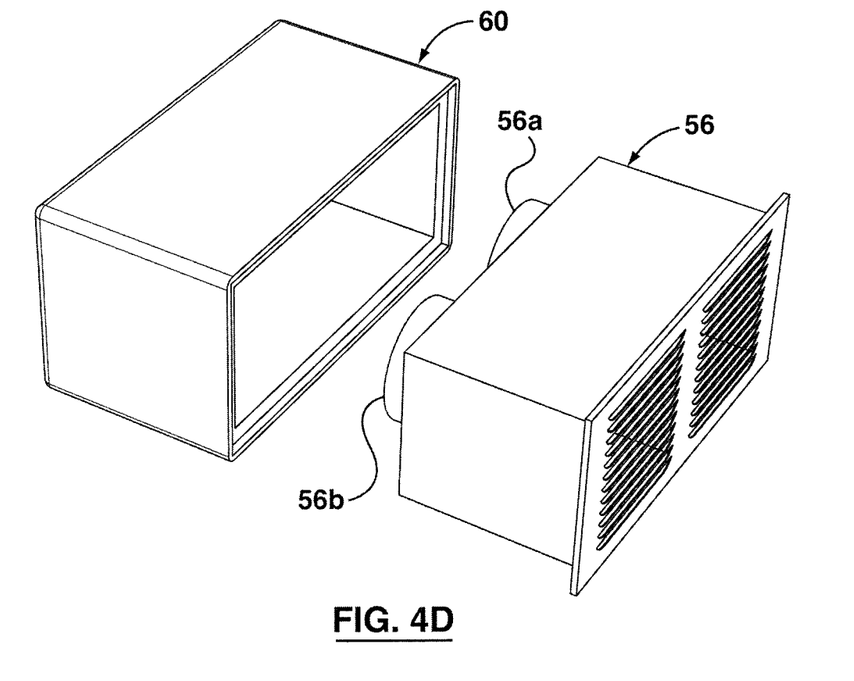
FIG. 4D is an exploded isometric view of the wall box and pre-formed covering of FIG. 4A as seen from a first vantage point.
Figure 4E:
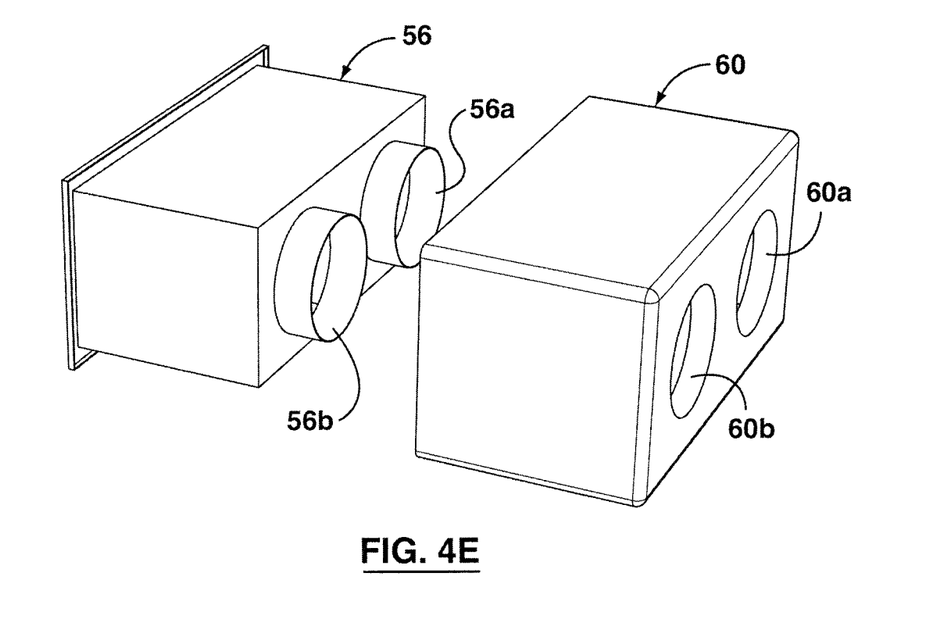
FIG. 4E is an exploded isometric view of the wall box and pre-formed covering of FIG. 4A as seen from a second vantage point generally opposite the first vantage point.
Figure 5A:
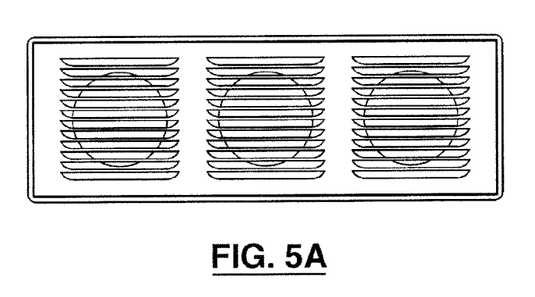
FIG. 5A is an exterior side view showing a "rear" wall of a three inlet wall box.
Figure 5B:
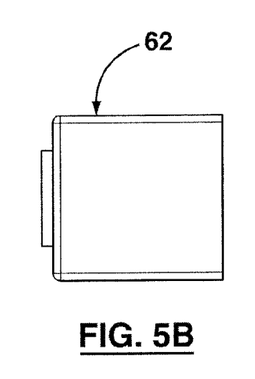
FIG. 5B is a side view of the wall box of FIG. 5A shown with a pre-formed covering according to a third embodiment of the invention installed thereon.
Figure 5C:
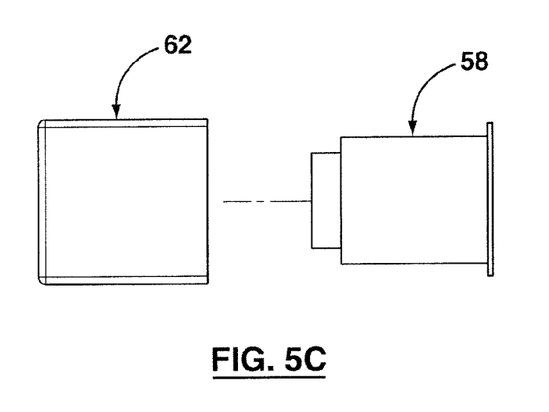
FIG. 5C is an exploded side view of the wall box and pre-formed covering of FIG. 5A.
Figure 5D:
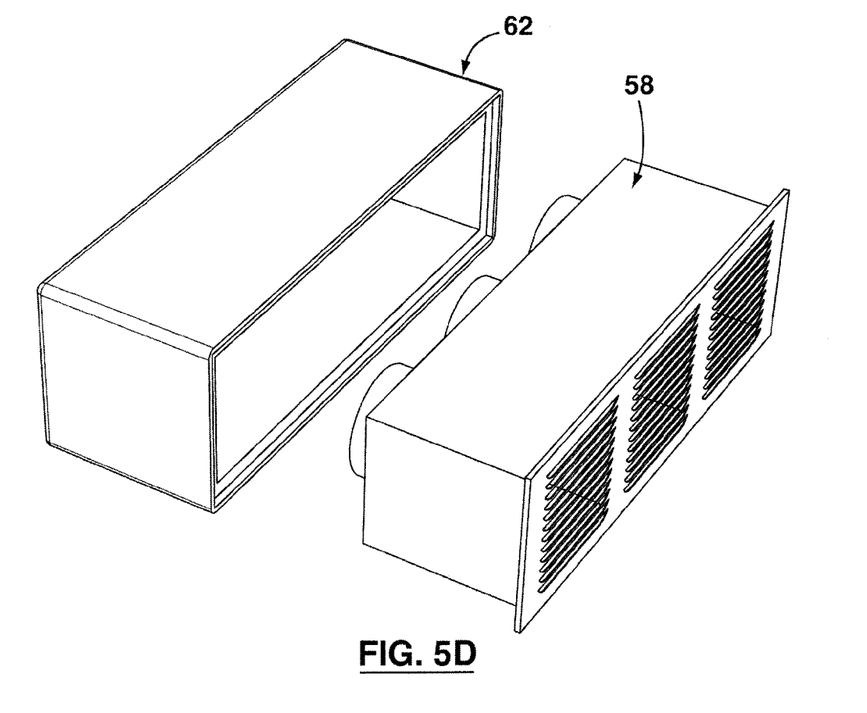
FIG. 5D is an exploded isometric view of the wall box and pre-formed covering of FIG. 5A as seen from a first vantage point.
Figure 5E:
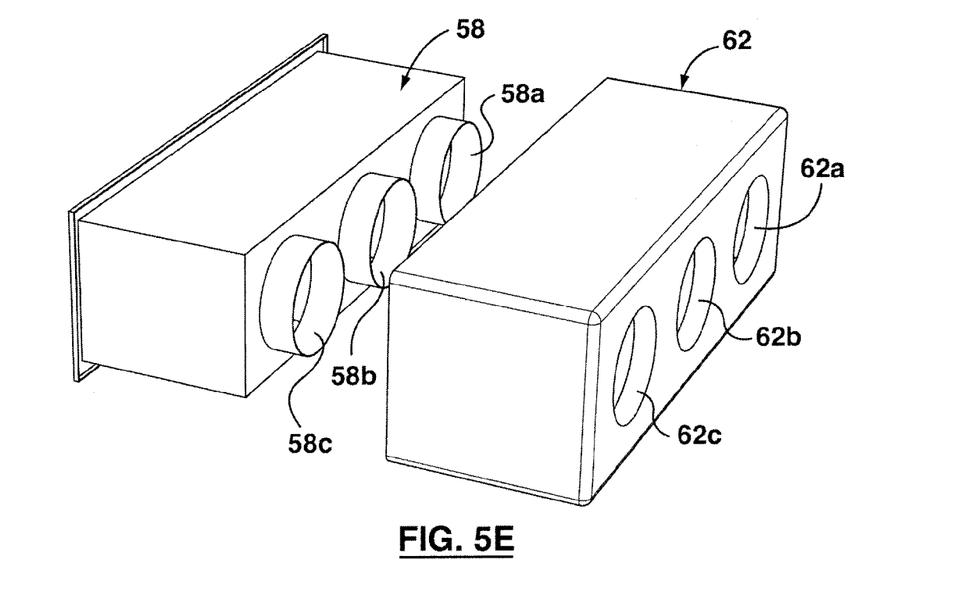
FIG. 5E is an exploded isometric view of the wall box and pre-formed covering of FIG. 5A as seen from a second vantage point generally opposite the first vantage point.

As shown in FIGS. 3A and 3D, the wall box 30 includes a rear wall in the form of a grate 52 coupled to and extending transversely to the side walls 42a, 42b, 42c, 42d at a second end opposite to the first end. The grate 52 has slits which collectively form an outlet 54 through which exhaust air from inside the building can exit to the outside. The grate 52 is larger than a transverse section of the spaced parallel side walls 42a, 42b, 42c, 42d and therefore includes a flanged perimeter 53.

The covering 36 is installed as follows. The wall box 30 is first installed within a window assembly that is installed on an exterior wall of a building. Caulking is applied to the inner surface of the flanged perimeter 53, and then the opening 50 of the pre-formed covering 36 and inlet 48 of the wall box 30 are aligned. Once aligned, the covering 36 is inserted over the sides 42a, 42b, 42c, 42d and front wall 46 of the wall box 30 with the circular flange 40 extending through the opening 50 of the pre-formed covering, as shown in FIGS. 2B and 3B. The caulking provides a seal between the covering 36 and the window assembly. More caulking is applied around the circular flange 40 to prevent moisture and/or air from leaking from the wall box through the opening 50 of the covering 36.

When fully installed, air from inside the building is carried through suitable ducts or tubing to the wall box 30, enters the air exhaust inlet 48, flows through the air flow channel 44, and exits through the outlet 54 defined by the slits in the grate 52 to the outside. When air inside the wall box 30 is colder than air outside the wall box 30, moisture can condense on the exterior of the wall box 30. The pre-formed covering 36 when installed and fully sealed at the edges to the wall box 30 will help prevent the condensed moisture from entering the building. The unitary construction of the pre-formed covering 36 makes it easier and faster to install than conventional spray foam insulation. The smooth and flat surfaces of this and other embodiments described herein make it easier to apply a further vapour barrier (plastic sheeting). Furthermore, the pre-formed covering is dimensioned so that drywall can be installed later without having to cut or remove any part of the covering.

It will be appreciated that numerous variations to the pre-formed cover 36 can be made within the context of the present invention. For example, the shape, configuration and dimensions can be altered to accommodate two and three inlet wall boxes 56, 58, respectively, as shown in FIGS. 4A, 4B, 4C, 4D, and 4E and 5A, 5B, 5C, 5D, and 5E. The two and three inlet wall boxes 56, 58 define multiple inlets 56a, 56b, 58a, 58b, 58c, respectively, and variant pre-formed coverings 60, 62 can be made to have corresponding openings 60a, 60b, 62a, 62b, 62c to align with the corresponding inlets. The two and three opening pre-formed coverings 60, 62 are shaped, configured and dimensioned to cover the two and three inlet wall boxes 56, 58, respectively, and to seal thereto in a manner similar to what has been described above.

Though preferred, the pre-formed coverings 36, 60, 62 need not be made in one piece but may comprise multiple pieces that are installed on the respective wall boxes 30, 56, 58 and sealed together and thereto with suitable sealing material (e.g. caulking).

The material of the pre-formed covering can be any air-impermeable (and therefore moisture impermeable) material such as Styrofoam™ or the like. Contained in ANNEX A is information on some moulding foam materials that can be used to make the preformed covering according to the invention. This information includes but is not limited to information about POLARFOAM™ PF-6352-0.

While the embodiments of the covering described herein are rectangular in shape, other shapes are contemplated and changes can be made to accord with the shape of the wall box. Furthermore, other methods for making the preformed covering are contemplated, such as the use of a silicone lining on the inside of the mold to help with the release of the molded foam covering. The mold can also be made entirely of silicon material that is placed inside a more rigid structure, like a hard wooden or metal box.

These and other changes to the afore-described embodiments will be apparent to the person skilled in the art and the description of embodiments is intended to be illustrative, rather than limiting the scope of the invention as defined by the following claims.

The invention claimed is:

1. A method of moisture-proofing a wall box, the wall box having a body comprises a pair of integrally connected, spaced parallel side walls that together define at least a portion of an air flow channel therebetween, a front wall integrally formed with and extending transversely to the side walls at a first end of the side walls, a tubular wall coupled to and extending transversely to the front wall, the tubular wall defining an inlet, a grate coupled to and extending transversely to the side walls at a second end of the side walls opposite to the first end of the side walls, the grate comprising slits forming an outlet, the grate being larger than a transverse section of the side walls and including a flanged perimeter, wherein the air flow channel is between and in fluid communication with the inlet and the outlet, the method comprising:
providing a pre-formed covering made of an air impermeable material, the pre-formed covering being configured, shaped and dimensioned to fit over the body, the pre-formed covering comprising a first opening for receiving the tubular wall, the front wall, and the side walls of the body of the wall box, and a face opposite the first opening, the face comprising a second opening for receiving the tubular wall of the wall box therein;
applying caulking to the flange perimeter of the grate;
placing the first opening of the pre-formed covering over the tubular wall, the front wall, and the side walls of the wall box;
sliding the pre-formed covering over the side walls of the body until the tubular wall was of the wall box is received in and extends through the second opening in the face of the pre-formed covering, the front wall is adjacent the face of the pre-form covering, and the grate covers the first opening; and
sealing the pre-formed covering by applying caulking to the second opening of the pre-form covering and to the tubular wall of the body of the wall box to minimize leakage of air or moisture from the tubular wall of the wall box.

2. The method of claim 1, wherein the pre-formed covering is of a unitary construction.

3. The method of claim 1, wherein the pre-formed covering has insulating properties.

4. The method of claim 1, wherein the pre-formed covering is rigid.

5. The method of claim 1, wherein the pre-formed covering is made of a moulded polyurethane foam.

6. The method of claim 5, wherein the polyurethane foam is made from a two-part, polyol isocyanate blend.

7. The method of claim 1, wherein the pre-formed covering is rectangular.

8. The method of claim 1, wherein the body of the wall box comprises a second tubular wall that defines multiple inlets and the pre-formed covering comprises a third opening for receiving the second tubular wall that defines the second inlet of the body of the wall box therein, and wherein sliding further comprises sliding the pre-formed covering over the body until the second tubular wall of the wall box is received in and extends through the third opening of the pre-formed covering.

9. The method of claim 1, wherein the pre-formed covering has a smooth and flat surface.

10. A pre-formed covering for use in moisture-proofing a wall box, having a body comprising a pair of integrally connected, spaced apart parallel side walls that together define at least a portion of an air flow channel therebetween, a front wall integrally formed with and extending transversely to the side walls at a first end of the side walls, a tubular wall coupled to and extending transversely to the front wall, the tubular wall defining an inlet, a grate coupled to the and extending transversely to the side walls at a second end of the side walls opposite to the first end of the side walls, the grate comprising slits forming an outlet, the grate being larger than a transverse section of the side walls and including a flanged perimeter, wherein the air flow channel is between and in fluid communication with the inlet and the outlet, the pre-formed covering comprising:
a covering made of an air impermeable material and configured, shaped and dimensioned to fit over the body, the cover comprising a first opening for receiving the tubular wall, the front wall, and the side walls of the body of the wall box, a face opposite the first opening, the face comprising a second opening for receiving the tubular wall of the wall box therein, and a rim surrounding the first opening for receiving the flanged perimeter of the grate, wherein when the pre-formed covering is installed over the wall box, the tubular wall is received in and extends through second opening, the front wall is adjacent the face of the pre-form covering the grate of the wall box covers the first opening of the pre-form covering, and the flanged perimeter of the grate mates with and seals the rim surrounding the first opening of the pre-form covering, the pre-formed covering being sealable to the wall box to minimize leakage of air from the wall box when installed over the wall box.

11. The pre-formed covering of claim 10, wherein the pre-formed covering is of a unitary construction.

12. The pre-formed covering of claim 10, wherein the pre-formed covering has insulating properties.

13. The pre-formed covering of claim 10 wherein the pre-formed covering is rigid.

14. The pre-formed covering of claim 10, wherein the pre-formed covering is made of a moulded polyurethane foam.

15. The pre-formed covering of claim 14, wherein the polyurethane foam is made from a two-part, polyol isocyanate blend.

16. The pre-formed covering of claim 10, wherein the pre-formed covering is rectangular.

17. The pre-formed covering of claim 10, wherein the face of the cover comprises a third opening spaced from the second opening, the third opening for receiving a second inlet defined by the body of the wall box therein.

18. The pre-formed covering of claim 10, wherein the pre-formed covering has a smooth and flat surface.

19. A pre-formed covering of claim 10 mounted to a wall box.

20. The method of claim 1, further comprising, prior to sliding, aligning the tubular wall the second opening in the face of the pre-formed covering.

21. The method of claim 1, wherein the pre-form covering further comprises a rim surrounding the first opening, the rim configured to receive the flanged perimeter of the grate, and wherein sliding further comprises sliding the pre-formed covering over the side walls of the body until the flange perimeter of the grate mates with the rim surrounding the first opening and seals the flanged perimeter to the rim.

22. The method of claim 8, further comprising:
applying caulking to the third opening of the pre-form covering and to the second tubular wall of the body to minimize leakage of air or moisture from the second tubular wall of the wall box.

23. The method of claim 8, wherein the body of the wall box comprises a third tubular wall that defines a third inlet and the face of the pre-formed covering comprises a fourth opening for receiving the third tubular wall that defines the second inlet of the body of the wall box therein, and wherein sliding further comprises sliding the pre-formed covering over the body until the third tubular wall of the wall box is received in and extends through the fourth opening of the pre-formed covering.

24. The method of claim 23, wherein sealing the pre-formed covering further comprises:
   applying caulking to the fourth opening of the pre-form covering and to the third tubular wall of the body to minimize leakage of air or moisture from the third tubular wall of the wall box.

* * * * *